(12) United States Patent
Li et al.

(10) Patent No.: US 11,815,711 B2
(45) Date of Patent: Nov. 14, 2023

(54) BROADBAND CASCADED SPLITTING FILM ARRAY WAVEGUIDE AND DISPLAY SYSTEM COMPRISING SAME

(71) Applicant: BEIJING LLVISION TECHNOLOGY CO., LTD., Beijing (CN)

(72) Inventors: Yong Li, Beijing (CN); Fei Wu, Beijing (CN); Zhenrong Zheng, Beijing (CN)

(73) Assignee: BEIJING LLVISION TECHNOLOGY CO., LTD., Beijing (CN)

( * ) Notice: Subject to any disclaimer, the term of this patent is extended or adjusted under 35 U.S.C. 154(b) by 864 days.

(21) Appl. No.: 16/761,163

(22) PCT Filed: Oct. 23, 2018

(86) PCT No.: PCT/CN2018/111509
§ 371 (c)(1),
(2) Date: Jul. 31, 2020

(87) PCT Pub. No.: WO2019/085796
PCT Pub. Date: May 9, 2019

(65) Prior Publication Data
US 2020/0363581 A1    Nov. 19, 2020

(30) Foreign Application Priority Data

Nov. 2, 2017   (CN) .......................... 201711062635.4

(51) Int. Cl.
*G02B 27/01*    (2006.01)
*F21V 8/00*    (2006.01)

(52) U.S. Cl.
CPC ....... *G02B 6/0076* (2013.01); *G02B 27/0172* (2013.01); *G02B 2027/0123* (2013.01)

(58) Field of Classification Search
CPC ...... G02B 6/00–567; G02B 27/00–648; G02B 2027/0105–0198
See application file for complete search history.

(56) References Cited

U.S. PATENT DOCUMENTS

2016/0077335 A1    3/2016 An et al.
2019/0041645 A1*   2/2019 Wu ........................ G02B 6/132

FOREIGN PATENT DOCUMENTS

CN    1632643 A    6/2005
CN    1834694 A    9/2006
(Continued)

*Primary Examiner* — Bao-Luan Q Le
*Assistant Examiner* — Christopher A Lamb, II
(74) *Attorney, Agent, or Firm* — Shumaker, Loop & Kendrick, LLP; John A. Miller

(57) ABSTRACT

The present disclosure provides a broadband cascaded splitting film array waveguide and a display system comprising the same. The cascaded splitting film array waveguide includes a plurality of glass substrates and a splitting film array, each film of the splitting film array is sandwiched between two adjacent glass substrates and consists of a plurality of H coatings and L coatings alternately arranged in sequence, wherein the H coatings are coatings made of a high refractive index material, the L coatings are coatings made of a low refractive index material, each film of the splitting film array has an even number of coatings, and thicknesses an, pn of the coatings of the film are selected based on the band width and angle of the light beam.

18 Claims, 7 Drawing Sheets

(56) References Cited

FOREIGN PATENT DOCUMENTS

| | | |
|---|---|---|
| CN | 103837988 A | 6/2014 |
| CN | 104062769 A | 9/2014 |
| CN | 107193078 A | 9/2017 |
| CN | 107728253 A | 2/2018 |

* cited by examiner

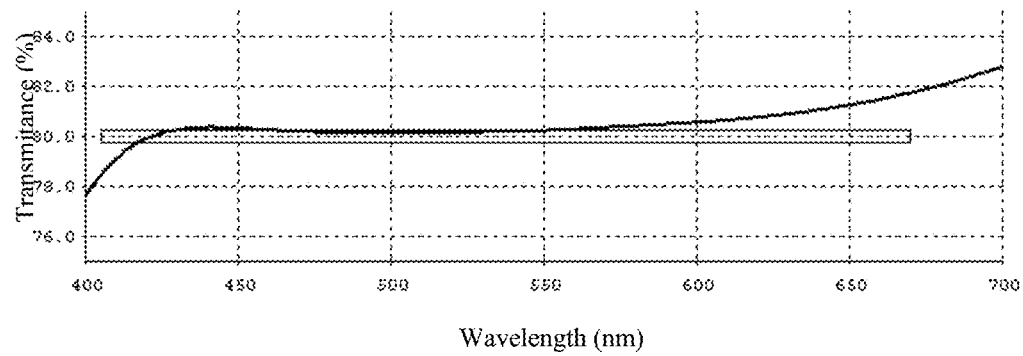
FIG.3 ( A )
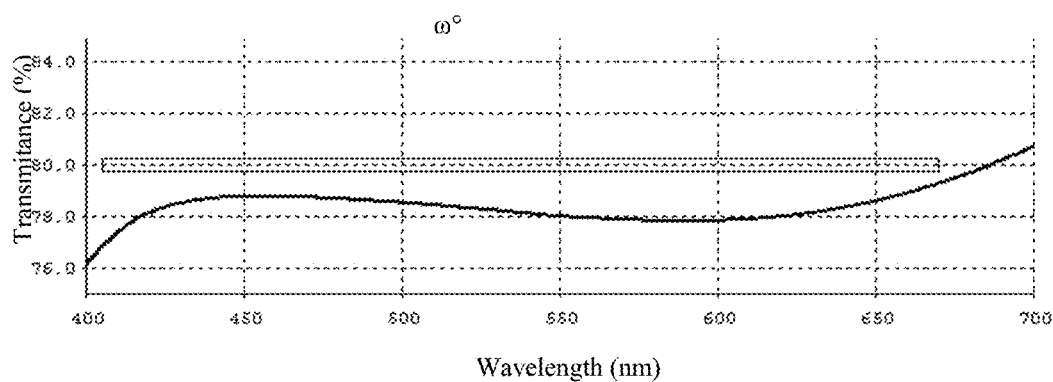
FIG.3 ( B )
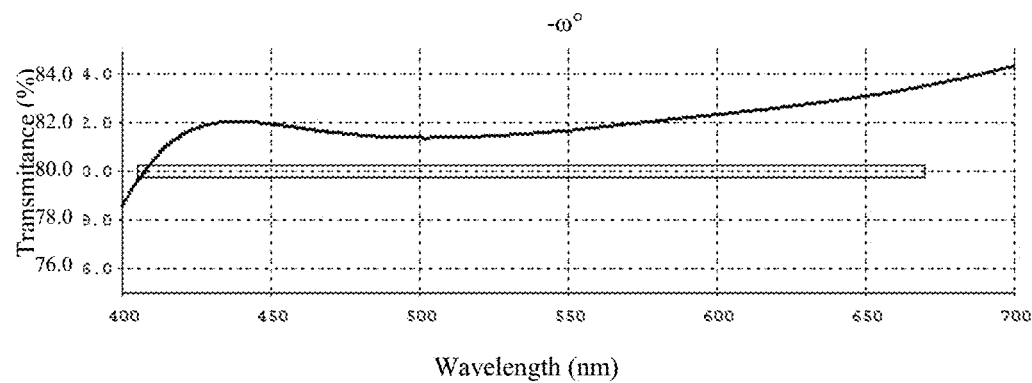
FIG.3 ( C )

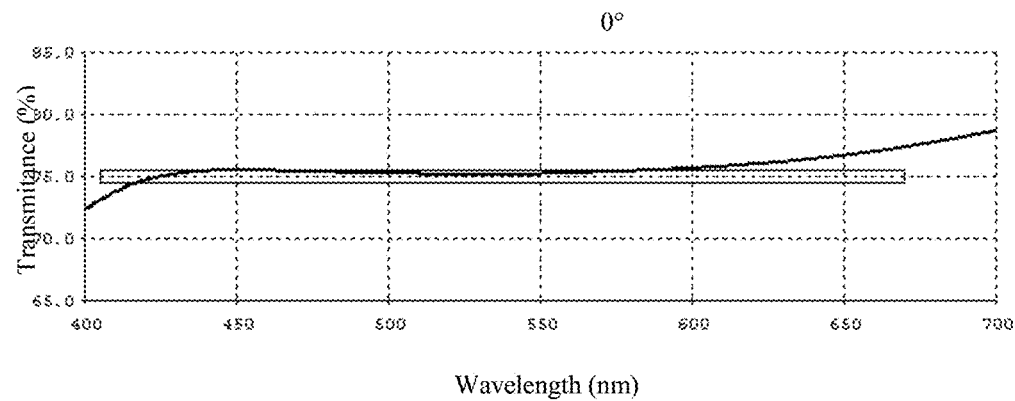
FIG.4 ( A )
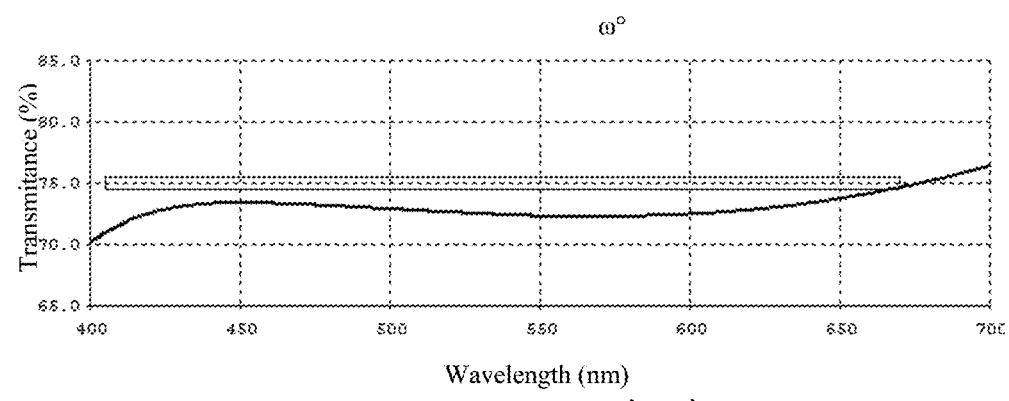
FIG.4 ( B )
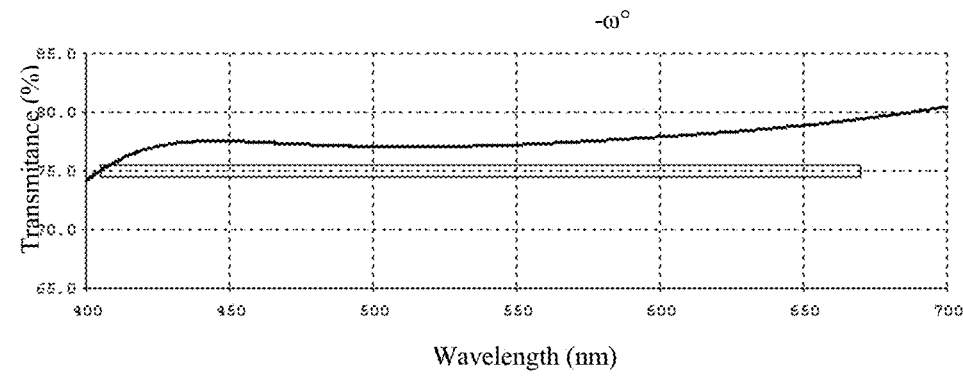
FIG.4 ( C )

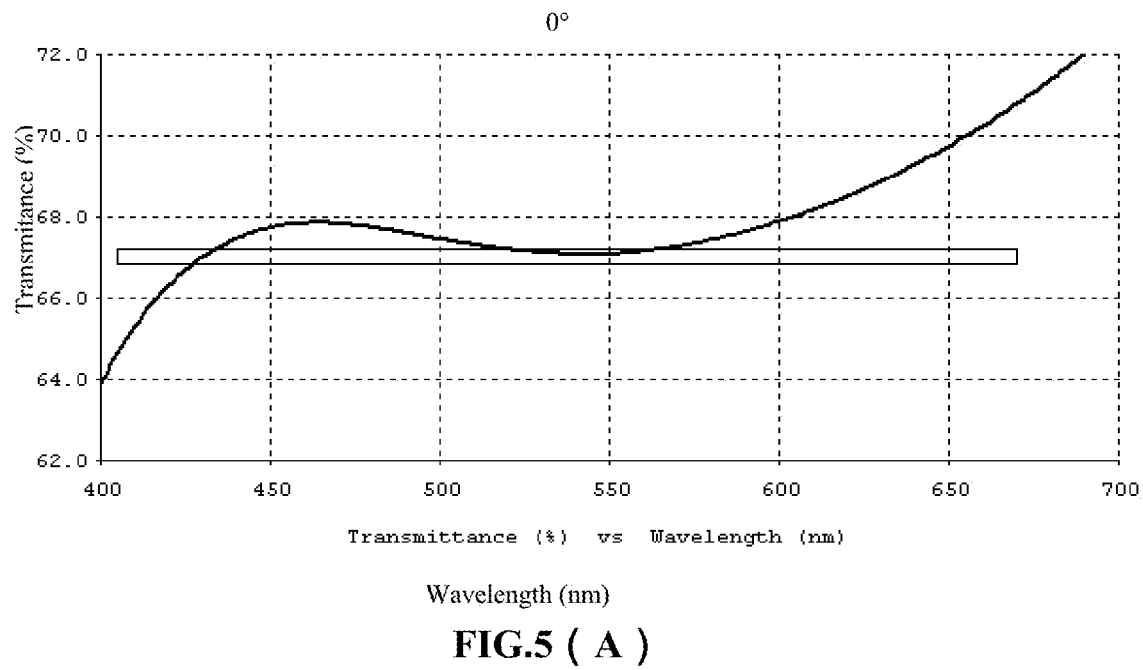
FIG.5 ( A )
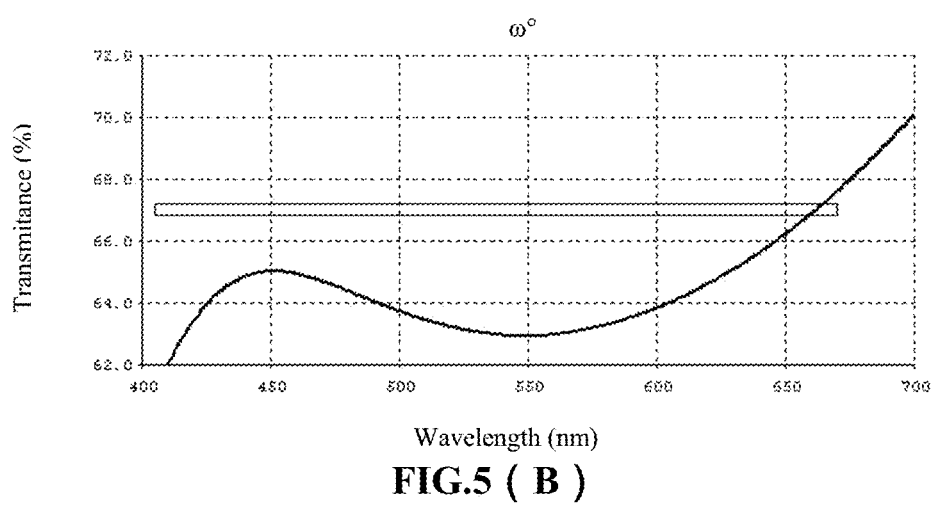
FIG.5 ( B )

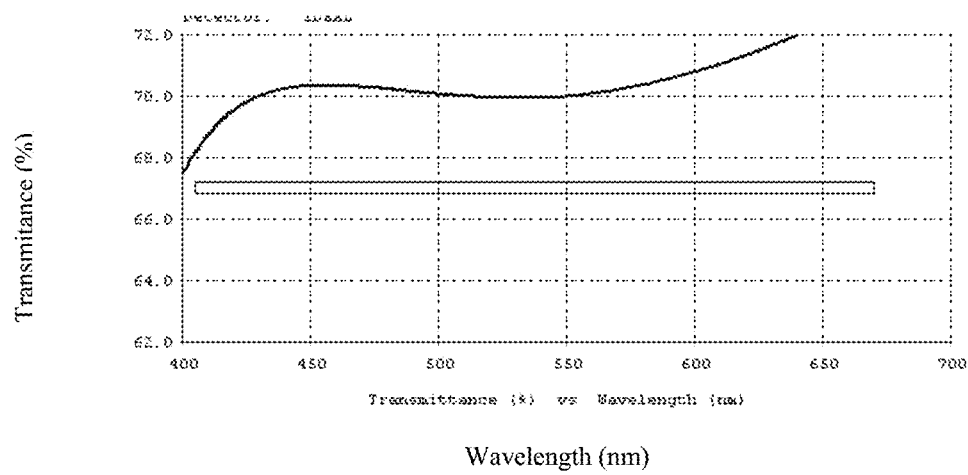
FIG.5 ( C )
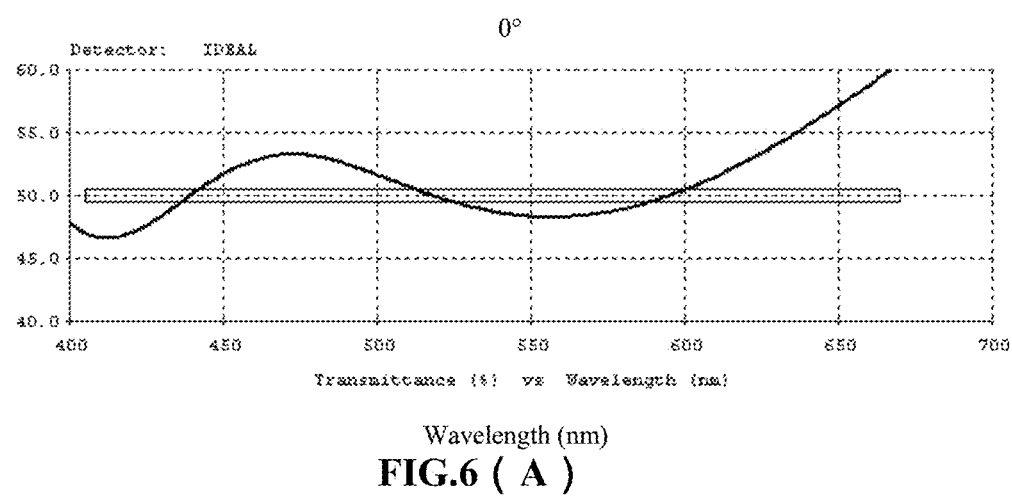
FIG.6 ( A )
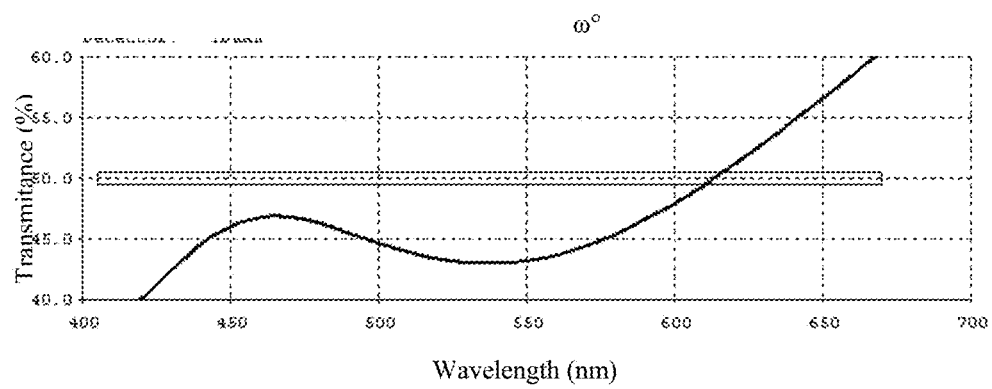
FIG.6 ( B )

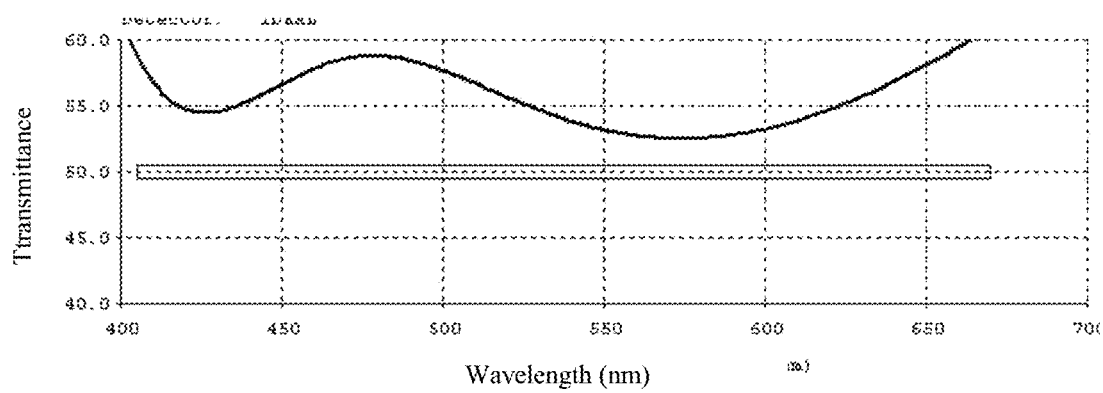
FIG.6 ( C )
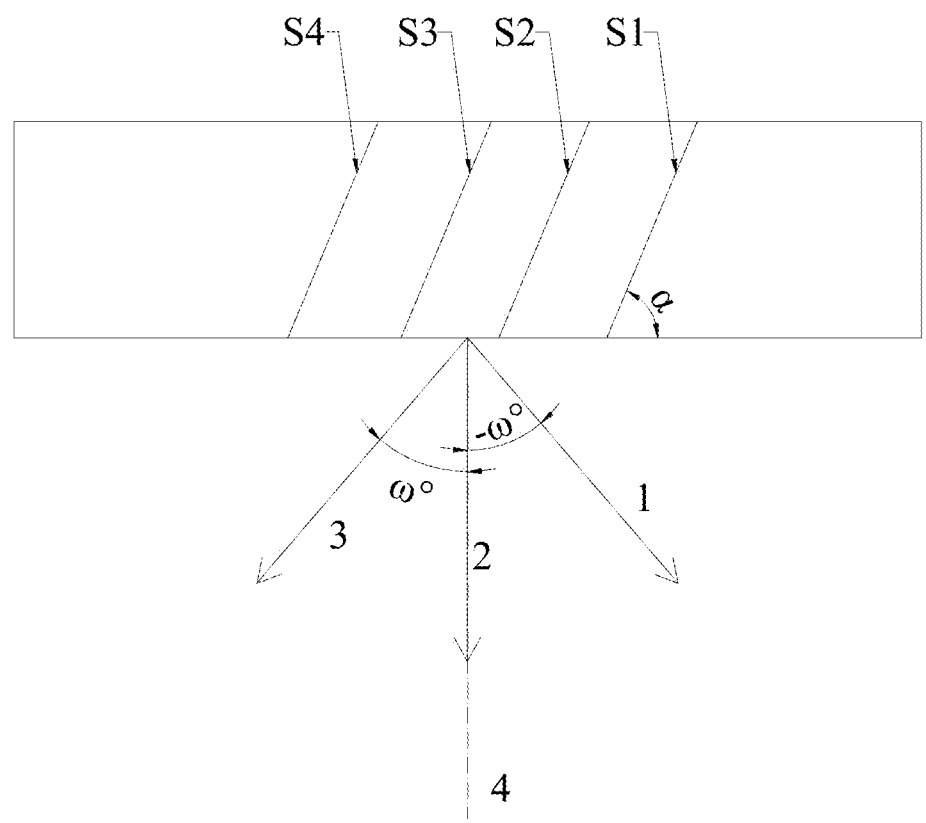
FIG.7

BROADBAND CASCADED SPLITTING FILM ARRAY WAVEGUIDE AND DISPLAY SYSTEM COMPRISING SAME

CROSS-REFERENCE TO RELATED APPLICATIONS

This application is a National Stage application of International Application No. PCT/CN2018/1115093 filed Oct. 23, 2018, which claims priority to China Patent Application Serial No. 201711062635.4 filed Nov. 2, 2017.

BACKGROUND

Field

The present disclosure relates to the technical field of optical displaying, and particularly to a broadband cascaded splitting film array waveguide and a display system comprising the broadband cascaded splitting film array waveguide.

Discussion of the Related Art

In recent years, with the emergence of a large number of head-mounted visual devices, for example, Lenovo glasses, Google glasses, glasses for virtual reality (VR) game and likes, virtual reality (VR), augmented reality (AR) and mixed reality (MR) technologies are gradually entering our daily life. Head-mounted devices (HMD, also known as head-mounted visual devices) reflect two-dimensional images directly into the eyes of the viewer. Specifically, it magnifies the images on an ultra-microscopic screen through a set of optical systems (mainly precision optical lenses) and projects them on the retina to present the magnified images in the eyes of the viewer. In other words, it is similar to take a look to an object with a magnifying glass, where the eyes of the viewer receive an enlarged image of a virtual object. The images can be obtained directly via a light emitting diode (LED), an active matrix liquid crystal display (AMLCD), an organic light emitting diode (OLED) or a liquid crystal silicon (LCOS), or indirectly via an optical fiber and other conductive means. The display system forms an image at infinity point through a collimating lens, and then reflects the image into the human eyes through a coupler while ensuring that an image from the environment is clearly visible.

When the augmented reality display system superimposes the virtual information into the real scene, it requires not only a high brightness of virtual information but also a good transmittance of the real scene. Free-form curved prism, transmitting eyepiece, and other transmitting optical solutions with single-piece type coupler, on the one hand, have a large volume and are difficult to achieve a large field of view and a large exit pupil diameter at the same time. On the other hand, the sum of the efficiency of light energy q and the external transmittance m of the single-piece type coupler must be less than 100%. When the efficiency of light energy is too high, the optical system has poor transmittance and impairs the comfort of use and the indoor experience, and when the external transmission m is high, the efficiency of light energy and the brightness of the virtual image are poor, which is difficult to fulfill the requirement of outdoor applications.

Therefore, how to develop a coupler in a near-eye display system with a large field of view and a large exit pupil diameter, which improves the transmittance and the efficiency of virtual image light energy, has become a problem that those skilled in the art need to solve for a long time.

SUMMARY

A main object of the present disclosure is to provide a broadband cascaded splitting film array waveguide with high uniformity.

Another object of the present disclosure is to provide an application of the broadband cascaded splitting film array waveguide with high uniformity.

In order to achieve the above objects, on one hand, the present disclosure provides a broadband cascaded splitting film array waveguide with a high uniformity, wherein, the cascaded splitting film array waveguide includes a plurality of glass substrates and a splitting film array, wherein each film of the splitting film array is sandwiched between two adjacent glass substrates and consists of a plurality of H coatings and L coatings alternately arranged in sequence, wherein the H coatings are coatings made of a high refractive index material, the L coatings are coatings made of a low refractive index material, and each film of the splitting film array has an even number of coatings.

It can be appreciated that the structure of each film of the splitting film array of the present disclosure may be $\alpha 1 H \beta 1 L / \alpha 2 H \beta 2 L / \ldots \alpha n-1 H \beta n-1 L / \alpha n H \beta n L$, while the structure of the cascaded splitting film array waveguide may be glass substrate/$\alpha 1 H \beta 1 L / \alpha 2 H \beta 2 L / \ldots / \alpha n-1 H \beta n-1 L / \alpha n H \beta n L$/glass substrate/$\alpha 1 H \beta 1 L / \alpha 2 H \beta 2 L / \ldots / \alpha n-1 H \beta n-1 L / \alpha n H \beta n L$/glass substrate/ . . . /glass substrate, where $\alpha 2, \ldots,$ and an indicate the $1^{st}$ to $n^{th}$ H coatings, and $\beta 1, \ldots,$ and $\beta n$ indicate the $1^{st}$ to $n^{th}$ L coatings, respectively.

That is to say, the glass substrates and the films of the splitting film array of the present disclosure are arranged in an alternating manner, and both ends of the cascaded splitting film array waveguide in the light incident direction are glass substrates.

In some embodiments of the present disclosure, the average transmittance of the films of the splitting film array is 50 to 80%.

In some embodiments of the present disclosure, the distance between two adjacent polarizing films of the splitting film array is 2 to 5 mm.

In some embodiments of the present disclosure, the refractive index n of the high refractive index material H is greater than 2.0; and the refractive index n of the low refractive index material L is less than 1.5.

As a result, the number of the coatings can be reduced by increasing the difference among the refractive indexes, thereby simplifying the manufacturing process and improving the yield.

In some embodiments of the present disclosure, the high refractive index material H is $Ta_2O_5$.

In some embodiments of the present disclosure, the low refractive index material L is $SiO_2$.

In some embodiments of the present disclosure, the number of coatings in each film of the splitting film array is 4 to 12. In some embodiments, the number of coatings is 6 to 8.

Because the light has large angle and covers the entire wave spectrum, if the number of coatings is few, the transmittance will have sharp fluctuation over the spectrum, but if the number of coatings is excessive, the requirements for coating equipment and coating technology will be high. The present disclosure controls the number of coatings at 6-8 by means of reasonably balancing the variations in the transmittance curve of each film at different angles and different wavebands.

In some embodiments of the present disclosure, the included angle between bottom surfaces of the glass substrates and the films of the splitting film array (the angle a shown in FIG. 1 and FIG. 7) is 20° to 45°.

In some embodiments of the present disclosure, the minimum included angle between the surfaces of the glass substrates adjacent to the films of the splitting film array and the sidewall of the glass substrates is 25° to 35°.

In some embodiments of the present disclosure, the minimum included angle between the surfaces of the glass substrates adjacent to the films of the splitting film array and the sidewall of the glass substrates is 27.5°.

From the above, in the case the included angle is excessive, the thickness and the volume of the waveguide are increased, which leads to an increased cost. In the case the included angle is inadequate, the incident angle of the transmitted light in the waveguide to the film array is too large so that when the light is S light, its S light component is difficult to reduce, according to the Brewster's law, greatly increasing the complexity in the design of film array.

In some embodiments of the present disclosure, the number of films of the splitting film array in the cascaded splitting film array waveguide is four.

In some embodiments of the present disclosure, the cascaded splitting film array waveguide is constituted by five glass substrates and the splitting film array having total four films each of which is sandwiched between two adjacent glass substrates.

In some embodiments of the present disclosure, the films of the splitting film array have 8, 6, 6 and 6 coatings according to a sequence in the light incident direction, respectively.

In some embodiments of the present disclosure, the polarizing films of the splitting film array of the cascaded splitting film array waveguide are film S1, film S2, film S3, and film S4 according to the sequence in the light incident direction, respectively. In some embodiments of the present disclosure, the total thickness of the film S1 is 392.58 nm, the total thickness of the film S2 is 531.94 nm, the total thickness of the film S3 is 507.48 nm, and the total thickness of the film S4 is 587.00 nm.

In some embodiments of the present disclosure, the thicknesses of coatings of the film S1 from top to bottom are 16.69 nm, 51.31 nm, 85.72 nm, 41.53 nm, 115.00 nm, 62.42 nm, 9.67 nm and 10.24 nm, respectively; the thicknesses of coatings of the film S2 from top to bottom are 24.33 nm, 64.75 nm, 49.71 nm, 90.03 nm, 112.12 nm and 191.00 nm, respectively; the thicknesses of coatings of the film S3 from top to bottom are 20.62 nm, 57.20 nm, 66.11 nm, 73.20 nm, 107.25 nm and 183.10 nm, respectively; and the thicknesses of coatings of the film S4 from top to bottom are 27.30 nm, 94.40 nm, 72.90 nm, 88.30 nm, 110.40 nm and 193.70 nm, respectively.

In some embodiments of the present disclosure, a first coating of the films of the splitting film array of the cascaded splitting film array waveguide arranged in the light incident direction is a coating of $Ta_2O_5$.

In some embodiments of the present disclosure, the reflectance of the film S4 is 50%.

In some embodiments of the present disclosure, the average transmittance of the film S1 is 80%.

In some embodiments of the present disclosure, the average transmittance of the film S2 is 75%.

In some embodiments of the present disclosure, the average transmittance of the film S3 is 67%.

In some embodiments of the present disclosure, the average transmittance of the film S4 is 50%.

Another aspect of the present disclosure is to provide an application of the broadband cascaded splitting film array waveguide with high uniformity in a display system.

In some embodiments of the present disclosure, the display system is a near-eye display system.

The collimating optical system collimates each image point of the polarizing micro-image source to convert it into parallel light at various angles.

The coupling prism couples the collimated parallel light into the waveguide under the condition of total reflection. The light firstly propagates in the waveguide based on the principle of total reflection until it encounters the polarizing reflection film array, where the total reflection condition is destroyed after reflection, and a portion of the light exits the waveguide and enters the human eye. Suppose that polarizing reflection films are S1, S2, . . . , SN from right to left, and their spectral reflectance is $R_1, R_2, \ldots, R_N$ respectively, and transmittance of the waveguide glass is T, the efficiencies n of the exiting lights on each film can be obtained as:

$\eta_1: R_1 * T$ $\eta_2: R_2 * (1-R_1) * T$ $\eta_3: R_3 * (1-R_2) * (1-R_1) * T$ $\eta_N: R_N * (1-R_N) * \ldots * (1-R_1) * T.$ In order to meet the uniformity requirement of the image, it is necessary to fulfill:

$\eta_1 = \eta_2 = \ldots = \eta_N.$

When the reflectance of the leftmost film is 1/P, the reflectance of each film is derived and calculated as:

$R_1 = 1/(P+N-1)$ $R_2 = 1/(P+N-2)$

. . .

$R_{N-1} = 1/(P+1)$ $R_N = 1/P$.

It can be calculated that the efficiency of the energy of virtual image light is N/(P+N−1), then the transmittance of light from external environment is:

$(1-1/(P+N-1)) + (1-(P+N-2)) + \ldots + (1-1/P).$

When a polarized light source is used, the films can be designed according to the principle of polarization.

When the light of the incident image is P light, only the P light is partially reflected and split, and all of the S light is transmitted. When the light of the incident image is S light, at this time, the overall efficiency of the energy of virtual image light is still: N/(P+N−1), however, the transmittance of light from the external environment is more than doubled, reaching $2*[(1-1/(P+N-1)) + (1-(P+N-2)) + \ldots + (1-1/P)].$ In order to achieve a better transmittance of light from the external environment, it is generally selected as 1/P>50%. In considering the feasibility and actual effect of the manufacturing process, it is generally selected as $3 \leq N \leq 7$.

The above P light and S light refer to S polarized light (S light for short) and P polarized light (P light for short) indicating polarized light sources.

In actual film system design, it is almost impossible to have a consistent reflectance over the entire visible spectrum. On the basis of the uniformity of brightness, the uniformity of colors also needs to be considered. Considering that in the near-eye display system, the human eyes are the receiver, it is necessary to introduce the human eyes visual function to the overall evaluation.

The actual effective reflectance of the film array is $$H = \int_{380}^{780} K_m V(\lambda) R(\lambda) \Phi_e(\lambda) / \int_{380}^{780} K_m V(\lambda) \Phi_e(\lambda),$$

where $K_m$ is the maximum spectral luminous efficiency, which is 683 ml/W, $V(\lambda)$ is a luminous function of a spectral with a wavelength $\lambda$, $\Phi_e(\lambda)$ is a radiant flux of the spectral with a wavelength $\lambda$, and $R(\lambda)$ is the reflectance of the spectral with a wavelength $\lambda$ in a reflection spectrum of the film array.

The present disclosure implements a coating film Scheme of four coatings, which has the maximum reflectance 1/P=50%.

In summary, the present disclosure provides a broadband cascaded splitting film array waveguide and a display system comprising the same. The technical solutions of the present disclosure have the following advantages.

1. Polarizing film array reflection scheme is adopted so as to divide the single-piece type coupler of the conventional video transmitting type augmented reality optical system into pieces, it breaks the dilemma in the art: the efficiency of image light energy and the transmittance of external real scenes are mutually restricted. When the external transmittance reaches more than 75%, it can achieve a efficiency of miniature image sourced light energy of 70%.

2. Over a broadband range from 420 nm to 650 nm, it can achieve a uniformity on image brightness greater than 50% in a pupil area of 4 mm×4 mm without significant attenuation on the edges of the image and with little influence by angular offset.

3. It has a light weight and its thickness is merely ¼ of the single-piece type, without any additional protruding structure.

4. The film array adopt the same high refractive index and low refractive index materials, which leads to a feasible manufacturing process control and great mass productivity.

BRIEF DESCRIPTION OF THE DRAWINGS

FIG. 3(A)~FIG. 3(C) are spectral curves of the film S1 at field-of-view angles 0°, ω° and −ω°, respectively;

FIG. 4(A)~FIG. 4(C) are the spectral curves of the film S2 at field-of-view angles 0°, ω° and −ω°, respectively;

FIG. 5(A)~FIG. 5(C) are the spectral curves of the film S3 at field-of-view angles 0°, ω° and −ω°, respectively;

FIG. 6(A)~FIG. 6(C) are the spectral curves of the film S4 at field-of-view angles 0°, ω° and −ω°, respectively;

FIG. 7 is a schematic diagram of angles 0°, ω°, and −ω°; and

DETAILED DESCRIPTION OF THE EMBODIMENTS

The following describes the implementation process and beneficial effects of the present disclosure in detail through a specific embodiment, and is intended to help readers have an intuitive understanding of the present disclosure, and is not intended to limit the scope of the present disclosure.

Figure 1:
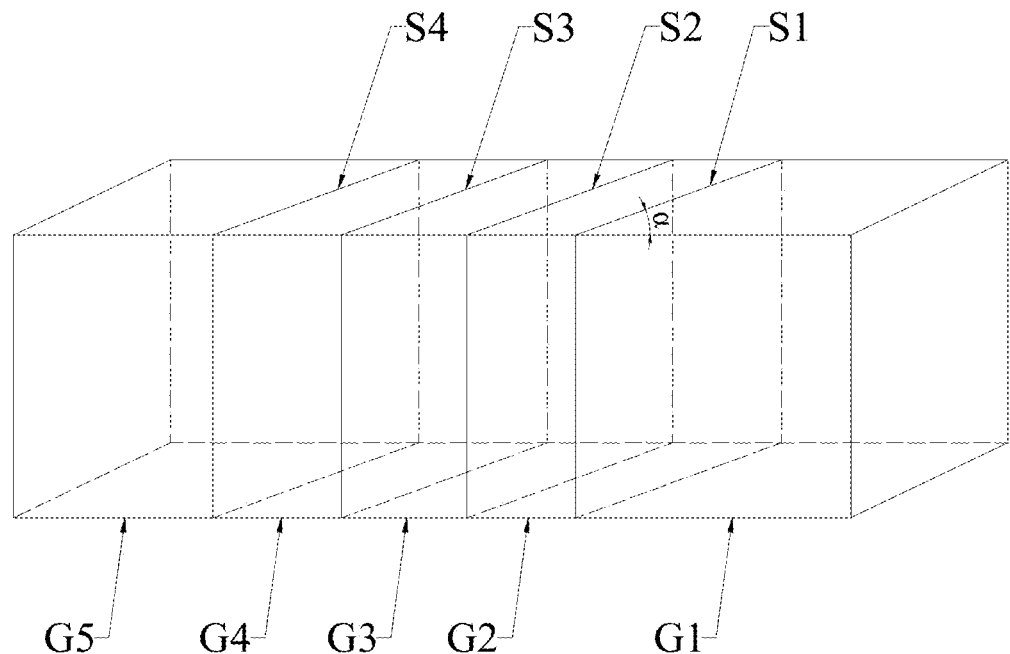
FIG. 1 is a schematic structural diagram of a thin coating array system suitable for a near-eye display system.

FIG. 1 is a schematic structural diagram of a thin coating array system suitable for a near-eye display system, which specifically includes glass substrates G1, G2, G3, G4 and G5, and cascaded polarizing films S1, S2, S3 and S4 of a splitting film array, each film is sandwiched between two adjacent glass substrates. Included angle a between bottom surfaces of the glass substrates and the films is 27.5°.

Figure 2:
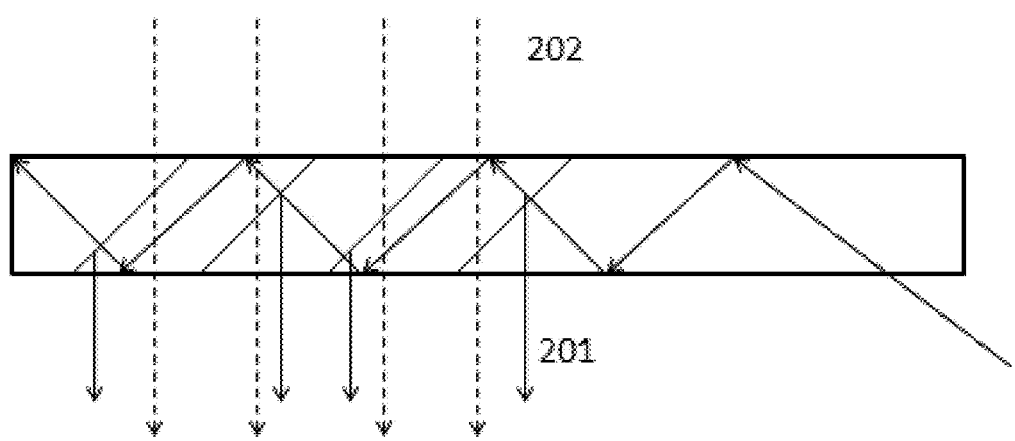
FIG. 2 is a partial schematic view of light transmitting in an array waveguide.
Figure 8:
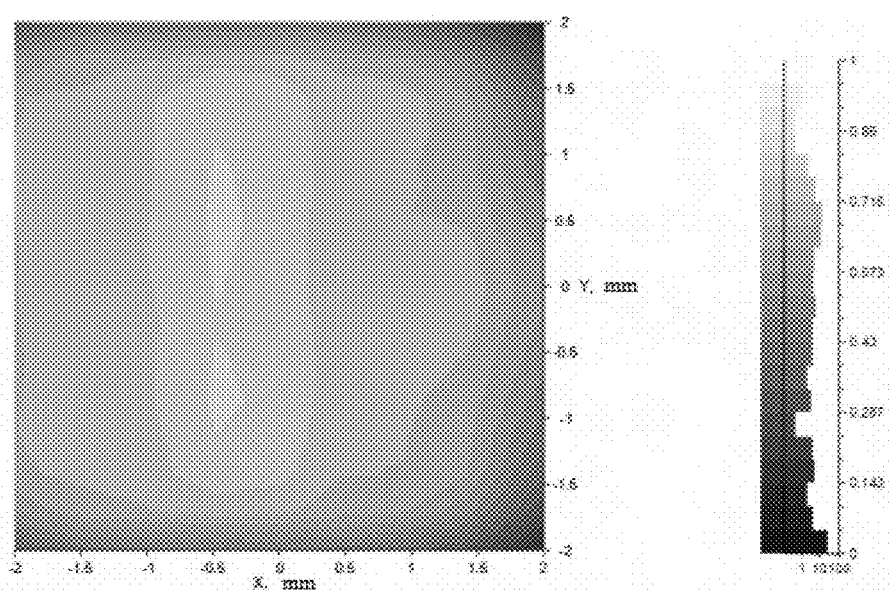
FIG. 8 is a schematic diagram of a uniformity of image brightness in a pupil area of 4 mm×4 mm.

FIG. 2 is a partial schematic view of light transmitting in an array waveguide, in which a field-of-view light 201 from an image source is shown as solid line, and a field-of-view light 202 from the outside is shown as dotted line. In the plate waveguide, the field-of-view light from the image source propagates according to the principle of total reflection. When the light encounters the polarizing reflection film, a portion of the light is reflected so that the total reflection condition is destroyed, and this portion of the light exits the waveguide and enters the human eyes while the rest of the light is transmitted and propagates to a further polarizing reflection film. Meanwhile, the field-of-view light from the outside may pass through the polarizing reflection film and enter the human eyes, thereby realizing a see-through display. The present disclosure adopts different coating methods for polarizing reflection films to realize that the total brightness of transmitted light of each reflection film is basically the same, and the effect of high uniformity of image brightness is achieved. As shown in FIG. 8, the coating scheme of the present embodiment achieves that the uniformity of image brightness in a broadband range of 420 nm-650 nm is greater than 50% in a pupil area of 4 mm×4 mm without significant attenuation on the edges of the image.

FIG. 3 shows the spectral curves of the film S1 at field-of-view angles 0°, ω° and −ω°. The film S1 has 8 coatings with a total thickness of 392.58 nm, in which ω° is 14°. The parameters of the film are as follows.

|  | 1 | 2 | 3 | 4 | 5 | 6 | 7 | 8 |
| --- | --- | --- | --- | --- | --- | --- | --- | --- |
| material | Ta$_2$O$_5$ | SiO$_2$ | Ta$_2$O$_5$ | SiO$_2$ | Ta$_2$O$_5$ | SiO$_2$ | Ta$_2$O$_5$ | SiO$_2$ |
| thickness of the coating | 16.69 | 51.31 | 85.72 | 41.53 | 115.00 | 62.42 | 9.67 | 10.24 |

In the coordinate system, the abscissa represents the wavelength, and the ordinate represents the transmittance. Herein, ω° represents the maximum value of the field-of-view angle, that is, the field-of-view angle ranges from −ω° to ω°. In the case where the field-of-view angle is 0°, the transmittance ranges from 78.0% to 83.0%. In the case where the field-of-view angle is ω°, the transmittance ranges from 76.0% to 80.0%. In the case where the field-of-view angle is −ω°, the transmittance ranges from 79.0% to 84.0%. In the figure, the black box indicates the average transmittance over the entire field-of-view range, wherein the average transmittance is 80.0% for S1.

In the present disclosure, the −ω°, 0° and ω° are the angles between the exiting light and the normal line of the waveguide (ω° is in a range from 10° to 20° in general). As shown in FIG. 7, a dotted line labeled 4 is the normal line of the waveguide, the included angle of the normal line and the exiting light labeled 1 is $-\omega°$, the included angle of the normal line and the exiting light labeled 2 is $0°$, and the included angle of the normal line and the exiting light labeled 3 is $\omega°$.

FIG. 4 shows the spectral curves of the film S2 at field-of-view angles $0°$, $\omega°$ and $-\omega°$, wherein $\omega°$ is $14°$. The film S2 has 6 coatings with a total thickness of 531.93 nm.

| | 1 | 2 | 3 | 4 | 5 | 6 |
|---|---|---|---|---|---|---|
| material | $Ta_2O_5$ | $SiO_2$ | $Ta_2O_5$ | $SiO_2$ | $Ta_2O_5$ | $SiO_2$ |
| thickness of the coating | 24.33 | 64.75 | 49.71 | 90.03 | 112.12 | 191.00 |

In the case where the field-of-view angle is $0°$, the transmittance ranges from 73.0% to 78.5%. In the case where the field-of-view angle is $\omega°$, the transmittance ranges from 70.0% to 76.0%. In the case where the field-of-view angle is $-\omega°$, the transmittance ranges from 79.0% to 81.0%. In the figure, the black box indicates the average transmittance over the entire field-of-view range, wherein the average transmittance is 75.0% for S2.

FIG. 5 shows the spectral curves of the film S3 at field-of-view angles $0°$, $\omega°$ and $-\omega°$, wherein $\omega°$ is $14°$. The film S3 has 6 coatings with a total thickness of 507.48 nm.

| | 1 | 2 | 3 | 4 | 5 | 6 |
|---|---|---|---|---|---|---|
| material | $Ta_2O_5$ | $SiO_2$ | $Ta_2O_5$ | $SiO_2$ | $Ta_2O_5$ | $SiO_2$ |
| thickness of the coating | 20.62 | 57.20 | 66.11 | 73.20 | 107.25 | 183.10 |

In the case where the field-of-view angle is $0°$, the transmittance ranges from 64.0% to 72.0%. In the case where the field-of-view angle is $\omega°$, the transmittance ranges from 62.0% to 70.0%. In the case where the field-of-view angle is $-\omega°$, the transmittance ranges from 68.0% to 72.0%. In the figure, the black box indicates the average transmittance over the entire field-of-view range, wherein the average transmittance is 67.0% for S3.

FIG. 6 shows the spectral curves of the film S4 at field-of-view angles $0°$, $\omega°$ and $-\omega°$, wherein $\omega°$ is $14°$. The film S4 has 6 coatings with a total thickness of 587 nm.

| | 1 | 2 | 3 | 4 | 5 | 6 |
|---|---|---|---|---|---|---|
| material | $Ta_2O_5$ | $SiO_2$ | $Ta_2O_5$ | $SiO_2$ | $Ta_2O_5$ | $SiO_2$ |
| thickness of the coating | 27.30 | 94.40 | 72.90 | 88.30 | 110.40 | 193.70 |

In the case where the field-of-view angle is $0°$, the transmittance ranges from 47.0% to 60.0%. In the case where the field-of-view angle is $\omega°$, the transmittance ranges from 40.0% to 60.0%. In the case where the field-of-view angle is $-\omega°$, the transmittance ranges from 52.5% to 60.0%. In the figure, the black box indicates the average transmittance over the entire field-of-view range, wherein the average transmittance is 50.0% for S4.

The calculated equivalent energy loss is $0.5 \times 0.67 \times 0.75 \times 0.8 = 0.201$. In considering the actual loss, the loss rate is less than 30%, that is, the efficiency of light energy from miniature image is higher than 70%.

The above is only a preferred embodiment of the present disclosure and is not intended to limit the present disclosure. Any modifications, equivalent replacements, improvements, and likes made within the spirit and principles of the present disclosure should be included in the scope of the present disclosure.

The invention claimed is:

1. A broadband cascaded splitting film array waveguide, comprising:
a plurality of glass substrates and a splitting film array, wherein each film of the splitting film array is sandwiched between two adjacent glass substrates, the structure of each film of the splitting film array is independent as $\alpha_1 H \beta_1 L / \alpha_2 H \beta_2 L / \ldots / \alpha_{n-1} H \beta_{n-1} L / \alpha_n H \beta_n L$, where H is a coating of high refractive index material and L is a coating of low refractive index material, the number of coatings in each film is 2n, spectral reflectances of respective films are $R_1$, $R_2$, ..., $R_N$ respectively, transmittance of the glass substrates is T, and efficiencies n of the exiting lights on the films of the splitting film array are:

$\eta_1$: $R_1 * T$ $\eta_2$: $R_2 * (1-R_1) * T$ $\eta_3$: $R_3 * (1-R_2) * (1-R_1) * T$ $\eta_N$: $R_N * (1-R_N) * \ldots * (1-R_1) * T$, $\eta_1 = \eta_2 = \ldots = \eta_N$, when the reflectance of the leftmost film is $1/P$, the reflectances of the films are:

$R_1 = 1/(P+N-1)$ $R_2 = 1/(P+N-2)$

...

$R_{N-1} = 1/(P+1)$ $R_N = 1/P$.

2. The cascaded splitting film array waveguide as claimed as in claim 1, wherein an average transmittance for each film of the splitting film array is 50 to 80%.

3. The cascaded splitting film array waveguide as claimed in claim 1, wherein a distance between two adjacent films of the splitting film array is 2 to 5 mm.

4. The cascaded splitting film array waveguide as claimed in claim 1, wherein a refractive index of the H coatings made of the high refractive index material is greater than 2.0, and the refractive index of the L coatings made of the low refractive index material is less than 1.5.

5. The cascaded splitting film array waveguide as claimed in claim 4, wherein the high refractive index material is $Ta_2O_5$, and the low refractive index material is $SiO_2$.

6. The cascaded splitting film array waveguide as claimed in claim 1, wherein the number 2n of coatings in each film is 4 to 12.

7. The cascaded splitting film array waveguide as claimed in claim 6, wherein the number 2n of coatings in each film is 6-8.

8. The cascaded splitting film array waveguide as claimed in claim 1, wherein an included angle between bottom surfaces of the glass substrates and the films of the splitting film array is $20°$ to $45°$.

9. The cascaded splitting film array waveguide as claimed in claim 8, wherein the included angle between the bottom surfaces of the glass substrate and the films of the splitting film array is 25° to 35°.

10. The cascaded splitting film array waveguide as claimed in claim 8, wherein the included angle between the bottom surfaces of the glass substrates and the films of the splitting film array is 27.5°.

11. The cascaded splitting film array waveguide as claimed in claim 1, wherein the splitting film array in the cascaded splitting film array waveguide has four films.

12. The cascaded splitting film array waveguide as claimed in claim 11, wherein the splitting film array of the cascaded splitting film array waveguide consists of films S1 to S4 according to the sequence in the light incident direction, respectively, and wherein the total thickness of the film S1 is 392.58 nm, the total thickness of the film S2 is 531.94 nm, the total thickness of the film S3 is 507.48 nm, and the total thickness of the film S4 is 587.00 nm.

13. The cascaded splitting film array waveguide as claimed in claim 12, wherein a first coating of each film of the films S1 to S4 arranged in the cascaded splitting film array waveguide in the light incident direction is a coating of $Ta_2O_5$.

14. The cascaded splitting film array waveguide as claimed in claim 12, wherein the sequence of the splitting film array of the cascaded splitting film array waveguide in the light incident direction includes:

the thicknesses of the coatings of the film S1 from top to bottom are 16.69 nm, 51.31 nm, 85.72 nm, 41.53 nm, 115.00 nm, 62.42 nm, 9.67 nm and 10.24 nm, respectively;

the thicknesses of the coatings of the film S2 from top to bottom are 24.33 nm, 64.75 nm, 49.71 nm, 90.03 nm, 112.12 nm and 191.00 nm, respectively;

the thicknesses of the coatings of the film S3 from top to bottom are 20.62 nm, 57.20 nm, 66.11 nm, 73.20 nm, 107.25 nm and 183.10 nm, respectively; and the thicknesses of the coatings of the film S4 from top to bottom are 27.30 nm, 94.40 nm, 72.90 nm, 88.30 nm, 110.40 nm and 193.70 nm, respectively.

15. The cascaded splitting film array waveguide as claimed in claim 11, wherein the cascaded splitting film array waveguide is constituted by five glass substrates and the splitting film array having total four films each of which is sandwiched between two adjacent glass substrates.

16. The cascaded splitting film array waveguide as claimed in claim 11, wherein the numbers 2n of coatings of the four films of the splitting film array that are arranged according to a sequence in the light incident direction 8, 6, 6 and 6, respectively.

17. A display system, comprising the cascaded splitting film array waveguide as claimed in claim 1.

18. The display system claimed as claimed in claim 17, wherein the display system is a near-eye display system.

* * * * *